United States Patent [19]

Paschedag et al.

[11] 4,058,726

[45] Nov. 15, 1977

[54] RADIATION DETECTOR

[75] Inventors: Hansjoachim Paschedag; Hansjürg Keller, both of Mannedorf, Switzerland

[73] Assignee: Cerberus AG, Switzerland, Mannedorf, Switzerland

[21] Appl. No.: 707,834

[22] Filed: July 22, 1976

[30] Foreign Application Priority Data

| | | |
|---|---|---|
| Aug. 9, 1975 | Germany | 2535657 |
| May 18, 1976 | Germany | 7615724[U] |
| May 25, 1976 | Germany | 7616715[U] |

[51] Int. Cl.$^2$ .......... G01J 1/04

[52] U.S. Cl. .......... 250/353; 250/338; 250/342

[58] Field of Search .......... 250/338, 353, 342; 340/258 D

[56] References Cited

U.S. PATENT DOCUMENTS

| | | | |
|---|---|---|---|
| 3,703,718 | 11/1972 | Berman | 250/338 X |
| 3,886,360 | 5/1975 | Reiss et al. | 250/338 |
| 3,972,598 | 8/1976 | Kunz | 250/338 X |

*Primary Examiner*—Archie R. Borchelt
*Attorney, Agent, or Firm*—Werner W. Kleeman

[57] ABSTRACT

A radiation detector for simultaneously detecting electromagnetic radiation from a number of separate receiving regions by means of a single radiation receiver. Optical bundling means are arranged such that they direct the radiation emanating from the individual receiving regions onto the single radiation receiver. The optical bundling means comprise surfaces having two different main radii of curvature. The radiation receiver is arranged at the one main focal point of the individual surfaces.

11 Claims, 4 Drawing Figures

RADIATION DETECTOR

BACKGROUND OF THE INVENTION

The present invention relates to a new and improved construction of radiation detector for the simultaneous detection of electromagnetic radiation emanating from a number of separate receiving regions with the aid of a single radiation receiver.

Such detectors serve, for instance, for detecting objects or persons in a supervised room or area, for instance for the purpose of protecting against unauthorized entry or thievery.

It is already known to the art to detect electromagnetic radiation, for instance light, infrared- or ultraviolet-radiation emanating from a number of different receiving directions by employing a number of separate radiation detectors having directional characteristic. The receiving direction of the individual radiation detectors is adjusted to the desired radiation receiving directions. Such technique is, however, extremely complicated and expensive to carry out and the adjustment to the desired receiving directions is exceptionally difficult.

Therefore, attempts have repeatedly been made to construct a radiation detector, for receiving radiation from a number of different directions, having only a single radiation receiver. According to a prior art radiation detector of this type a screen equipped with a number of openings is mounted at a certain spacing from the single radiation receiver. The radiation can enter through the openings and impinge upon the radiation receiver. The connection lines between the radiation receiver and the individual openings correspond to the different provided radiation receiving directions. With such arrangement the individual receiving regions, however, possess a relatively large aperture angle, which furthermore cannot be adjusted. An exact adjustment to certain points or sectors is therefore not possible with this state-of-the-art arrangement.

Further, it is known for instance from U.S. Pat. No. 3,703,718 to produce different discrete receiving directions by means of optical bundling means, such as with the aid of a number of spherical lenses or spherical mirror-sections, the optical axes of which are aligned in accordance with the desired receiving directions, and a common radiation receiver is arranged at their focal points. What is disadvantageous with this proposal is that the shape and extent of the receiving region cannot be randomly selected and accommodated to given conditions. In the case of larger receiving regions it is necessary to provide a multiplicity of reflectors, rendering the installation impermissibly complicated and expensive.

SUMMARY OF THE INVENTION

Hence, it is a primary object of the present invention to provide a new and improved construction of a radiation detector which overcomes the aforementioned drawbacks of the prior art.

Another object of this invention aims at the provision of a radiation detector which is both simple and inexpensive to construct and fabricate, and which can be easily and with little very expenditure accommodated to the individual receiving regions with respect to direction, shape and aperture angle.

Now in order to implement these and still further objects of the invention, which will become more readily apparent as the description proceeds, the radiation detector of this development serves for the simultaneous detection of electromagnetic radiation from a number of separate receiving regions by means of a single radiation receiver, and further incorporates optical bundling or concentrating means which are arranged such that they conduct the radiation emanating from the individual receiving regions to the common radiation receiver. The optical bundling means comprise surfaces, each of which have two different main radii of curvature. The radiation receiver is arranged in the one main focal point of the individual surfaces.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
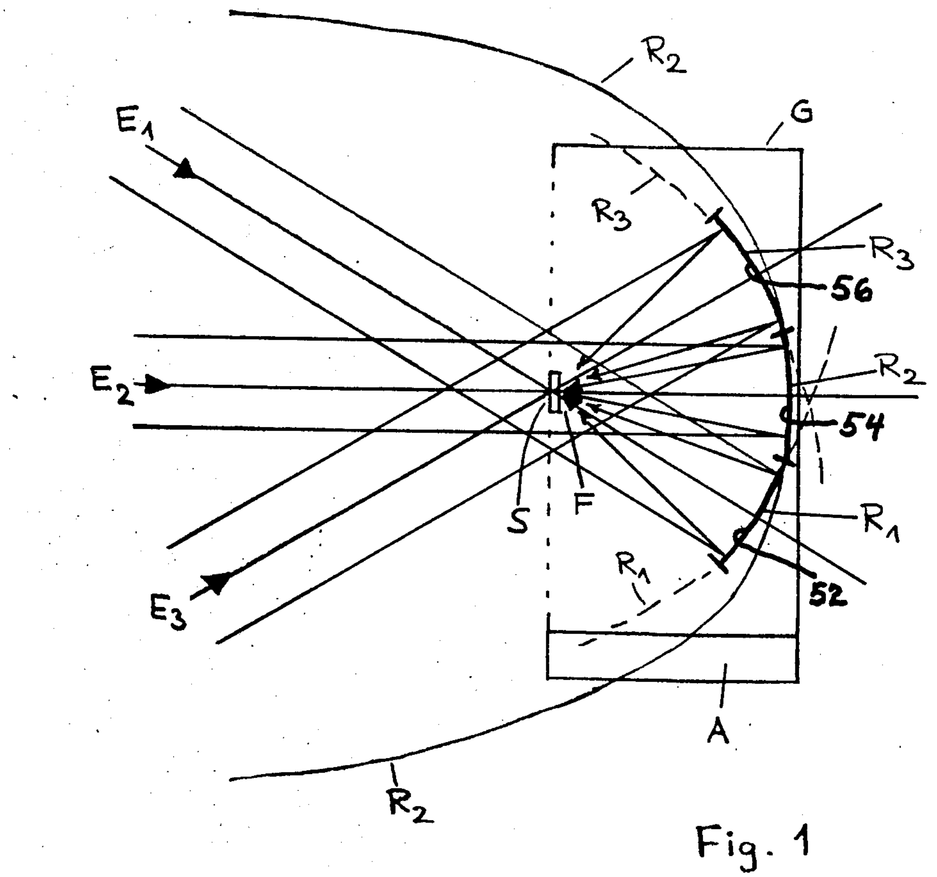
FIG. 1 illustrates a radiation detector, in horizontal section, having three separate receiving directions.

Describing now the drawings, the radiation detector illustrated in horizontal sectional view in FIG. 1 will be seen to comprise a radiation receiver S arranged at an open front side 50 of a housing G such that its receiving direction is oriented towards the inside of the housing. This radiation receiver S can possess a specific sensitivity with respect to the radiation which is to be detected, that is to say, can be sensitive for the detection of light, infrared- or ultraviolet radiation. Internally of the housing G there is located a reflector composed of a number of components or elements $R_1$, $R_2$ and $R_3$ possessing the reflector surfaces 52, 54, 56 respectively. The individual reflector elements or components $R_1$, $R_2$ and $R_3$ are arranged in such a manner that the focal points of their horizontal sections approximately coincide at a point F which is located at the direct neighborhood of the radiation receiver S. The axes of the three reflector surfaces 52, 54 and 56 are aligned in different directions $E_1$, $E_2$ and $E_3$ respectively. These directions are chosen such that they coincide with the center of the desired radiation receiving directions. The radiation receiver S is furthermore operatively connected with any conventional electrical evaluation circuit A which indicates the intensity of the change of the incident radiation from the contemplated receiving directions. The evaluation circuit is known as such and does not constitute part of the present invention.

If the horizontal sections of the reflector elements are in the shape of parabolas, then they possess the characteristic of being able to collect the radiation arriving in the direction of the parabola axis at the focal point F. The radiation detector illustrated in FIG. 1 thus only will take-up radiation in the direction of the parabola axes of the three reflector surfaces 52, 54 and 56, i.e. only from the three receiving directions $E_1$, $E_2$ and $E_3$, not however any radiation emanating from other directions located between the receiving directions $E_1$, $E_2$ and $E_3$.

It is here mentioned that in principle the number of radiation receiving directions which may be provided for the arrangement illustrated in FIG. 1 is not limited. This number corresponds to the number of reflector elements. It is possible to use separate reflector elements which are individually adjusted to the desired receiving directions. However, it is of advantage to design the reflector elements as a mechanically integrated unit, that is to say as elements of a unitary or joined together reflector. This affords the advantage that it is possible to ensure that the individual focal points of the reflector surfaces truly will coincide at one point. During the assembly of the radiation detector it is then only necessary that the radiation receiver S is adjusted with respect to this single point. An individual adjustment of each reflector surface with regard to the radiation receiver is therefore superfluous.

Figure 2:
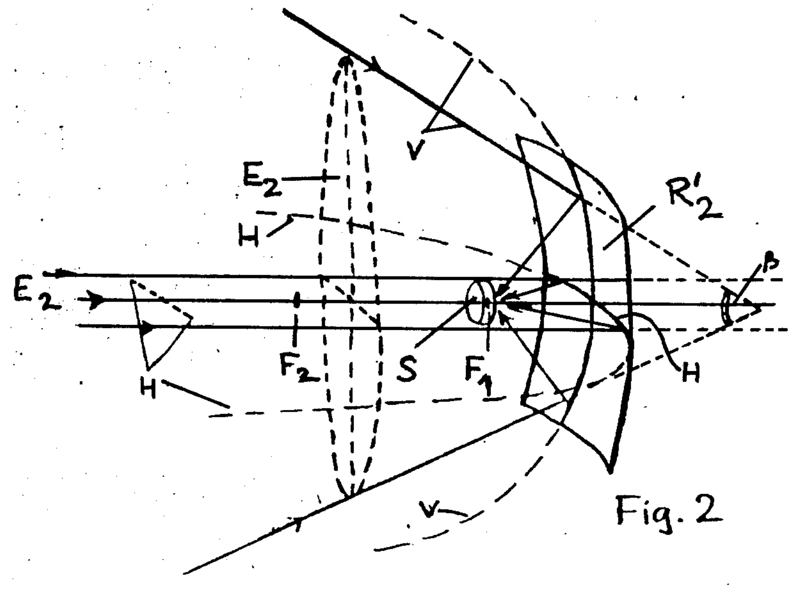
FIG. 2 is a perspectiive view illustrating a reflector surface of a radiation detector having two different main or principal radii of curvature.

If the reflector elements $R_1$, $R_2$ and $R_3$ are designed as accurately as possible as paraboloids of rotation and the radiation receiver S mounted as closely as possible at the common focal point F of the paraboloids of rotation, then the receiving directions $E_1$, $E_2$ and $E_3$ would be aligned relatively accurately at certain points. However, in practice it is often-times the case that there are desired radiation receiving regions of a certain size, i.e. having a certain aperture angle, for instance radiation only emanating from an exactly predetermined direction but from an elevational region of relatively large extent. In such case the horizontal aperture angle of the radiation receiving region must be as small as possible, the vertical aperture angle however relatively large. Now in FIG. 2 there is illustrated a reflector component or element $R'_2$ which is suitable for such field of application. This reflector element $R'_2$ is constructed as a doubly-curved surface having two different main or principal radii of curvature, wherein the main curvature directions are arranged vertically and horizontally. In both horizontal section H and vertical section V the reflector $R'_2$ in each case has a parabolic shape, and the parabolas can be approximated by circles having the same main radii of curvature.

The focal points $F_1$ and $F_2$ of both sections H and V, i.e. the main or principal focal points are therefore different. The radiation receiver S is arranged such that it at least approximately coincides with the focal point $F_1$ of the horizontal section H, whereas the focal point $F_2$ of the vertical section V is chosen to be at such a distance from the radiation receiver S that there prevails the desired vertical aperture angle $\beta$ of the receiving region. The remaining reflector elements are then similarly constructed and their axes in each instance are aligned with the desired radiation receiving direction. In this way there can be simultaneously received radiation from a number of separate vertical strip-shaped receiving regions of different alignment.

A radiation detector of this type is particularly suitable for determining whether there is located at the relevant receiving regions a self-radiating object, for instance a person radiating infrared- or thermal radiation. In the event that the radiation source is a moving source of radiation which passes in succession through the individual receiving regions, then the evaluation circuit A in this case will record one or a number of successive pulses.

Figure 3:
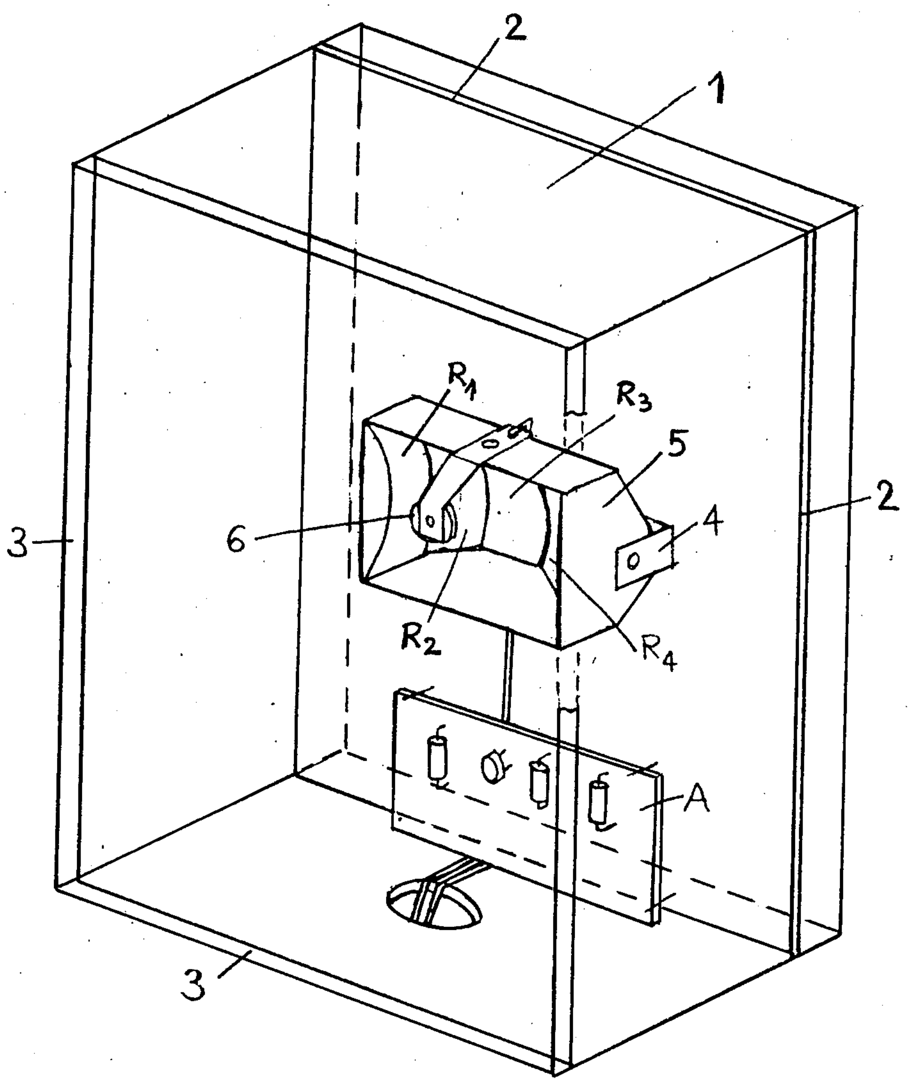
FIG. 3 illustrates a radiation detector incorporating a plurality of reflector surfaces and serving for monitoring a room or space.

FIG. 3 illustrates an apparatus for monitoring a room or space or for determining the presence of unauthorized individuals, for instance a thief, in a monitored room equipped with such radiation detector. There will be recognized that within a housing 1 there is mounted by means of a bracket 4, upon a plate 2 carrying the conventional evaluation circuit A of known design, a radiation detector 5 of the described type. This radiation detector 5 contains five reflector sections or elements $R_1$, $R_2$, $R_3$, $R_4$, $R_5$ of the construction considered above with regard to FIGS. 1 and 2 and at their singular focal point there is arranged a common radiation receiver 6. The front of the housing 1 is covered by a closure plate 3 which is pervious to infrared radiation.

Figure 4:
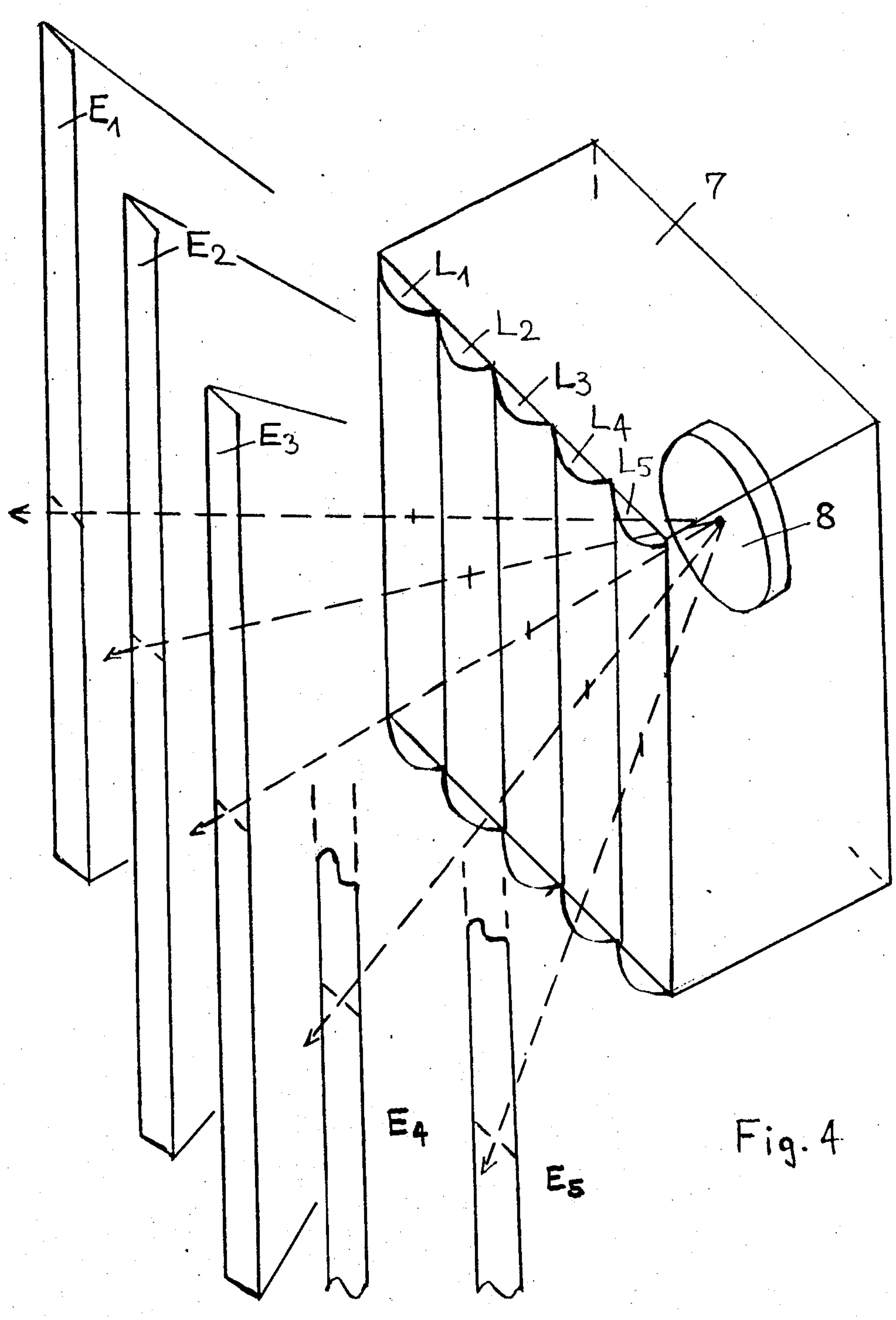
FIG. 4 illustrates a radiation detector having a number of cylindrical lenses.

In FIG. 4 there is illustrated a space or room monitoring apparatus where there is used as the optical bundling means, instead of reflector sections of the previously described embodiments, vertically oriented cylinder or cylindrical lenses $L_1$, $L_2$, $L_3$, $L_4$, $L_5$. These lenses are essentially parallelly arranged at the front of the housing 7. The radiation receiver 8, mounted at the rear of the housing 7, faces the front of such housing and is arranged at the focal lines of the cylinder lenses.

The function is completely equivalent to that of the embodiment of FIG. 3, and only the reflecting surfaces have been replaced by refraction surfaces. Since the cylindrical lenses are vertically arranged the vertical main radius of curvature of each lens is infinite in size, whereas the horizontal radius of curvature is finite. In this way there is achieved the result that the receiving zones $E_1$, $E_2$, $E_3$, $E_4$, $E_5$ possess only a very small horizontal aperture angle, however a relatively large vertical aperture angle. There is thus produced a strip-shaped receiving range pattern as is particularly desired when using the system for protection against unlawful entry.

In the described manner it is possible to devise a radiation detector which can be fabricated more simply and quicker than heretofore known detectors, yet possesses improved precision with respect to direction and aperture angle of the desired radiation receiving region, without requiring complicated adjustment of the individual receiving regions.

While there are shown and described present preferred embodiments of the invention, it is to be distinctly understood that the invention is not limited thereto, but may be otherwise variously embodied and practiced within the scope of the following claims. Accordingly,

What is claimed is:

1. A radiation detector for simultaneously detecting electromagnetic radiation from a number of separate receiving regions, comprising a single radiation receiver common to said number of separate receiving regions, a plurality of optical bundling means, each one of said optical bundling means being operatively related to a given one of said separate receiving regions and being arranged such that the radiation emanating from the individual receiving regions is transmitted to the single radiation receiver, each of the optical bundling means comprising an aspherical surface having two different main radii of curvature, and the radiation receiver is arranged at least approximately at one of the main focal points of the individual surfaces, for generating a pattern of spaced apart substantially strip-like receiving regions, each having a lengthwise extent considerably exceeding the width thereof.

2. The radiation detector as defined in claim 1, wherein the optical bundling means each consist of a reflector means having two different approximately parabolic-shaped main sections.

3. The radiation detector as defined in claim 2, further including means for integrating the individual reflector surfaces into a mechanical unit.

4. The radiation detector as defined in claim 3, wherein the reflector surfaces each have a main focal point and are aligned such that each of their main focal points at least approximately coincide.

5. The radiation detector as defined in claim 1, wherein the optical bundling means each comprise a substantially cylindrical lens.

6. The radiation detector as defined in claim 1, especially for detecting a self-radiating object at at least one of the receiving regions, further including an evaluation circuit for detecting, by means of a change of an output signal of the radiation receiver, passage of the object through at least one of the receiving regions.

7. The radiation detector as defined in claim 1, wherein the individual surfaces have main curvature directions oriented substantially horizontally and vertically with respect to the optical bundling of the radiation.

8. The radiation detector as defined in claim 7, wherein each receiving region has a vertical aperture angle which is greater than its horizontal aperture angle.

9. The radiation detector as defined in claim 8, wherein the horizontal aperture angles of the receiving regions approach zero.

10. The radiation detector as defined in claim 1, further including a housing having a front side which is pervious to infrared radiation, the optical bundling means of the radiation receiver being arranged in said housing.

11. The radiation detector as defined in claim 1, wherein the lengthwise extent of each receiving region is a multiple of the width thereof.

* * * * *